United States Patent
Andersson

(10) Patent No.: US 6,545,749 B1
(45) Date of Patent: Apr. 8, 2003

(54) ELECTRONIC DISTANCE MEASURING DEVICE

(75) Inventor: Leif Andersson, Taby (SE)

(73) Assignee: Spectra Precision AB, Danderyd (SE)

( * ) Notice: Subject to any disclaimer, the term of this patent is extended or adjusted under 35 U.S.C. 154(b) by 0 days.

(21) Appl. No.: 09/787,167

(22) PCT Filed: Sep. 16, 1999

(86) PCT No.: PCT/SE99/01618

§ 371 (c)(1),
(2), (4) Date: Mar. 14, 2001

(87) PCT Pub. No.: WO00/16122

PCT Pub. Date: Mar. 23, 2000

(30) Foreign Application Priority Data

Sep. 17, 1998 (SE) .............................................. 9803162

(51) Int. Cl.[7] .................................................. G01C 3/08
(52) U.S. Cl. ...................................... 356/5.01; 356/4.01
(58) Field of Search ............................... 356/3.01–5.15

(56) References Cited

U.S. PATENT DOCUMENTS

| | | | | |
|---|---|---|---|---|
| 3,765,765 A | * | 10/1973 | Hefter ............................ 356/4 |
| 3,788,741 A | * | 1/1974 | Buechler ........................ 356/4 |
| 3,901,597 A | * | 8/1975 | White ............................ 356/4 |
| 3,954,340 A | * | 5/1976 | Blomqvist et al. ........... 356/152 |
| 4,040,739 A | * | 8/1977 | Witte ............................. 356/4 |
| 4,108,551 A | * | 8/1978 | Weber ............................ 356/4 |
| 4,165,936 A | * | 8/1979 | Eisenring et al. ........... 356/4.01 |
| 4,355,904 A | * | 10/1982 | Balasubramanian ......... 356/376 |
| 4,384,199 A | * | 5/1983 | Ogino et al. ................. 250/204 |
| 4,713,544 A | * | 12/1987 | Grage .......................... 250/334 |
| 4,810,088 A | * | 3/1989 | Karning et al. ................. 356/5 |
| 4,825,091 A | * | 4/1989 | Breyer et al. ................ 250/560 |
| 4,843,228 A | * | 6/1989 | Nakamura .................... 250/201 |
| 4,902,128 A | * | 2/1990 | Siebecker et al. ........... 356/152 |
| 5,319,434 A | * | 6/1994 | Croteau et al. ................. 356/5 |
| 5,510,890 A | * | 4/1996 | Langdon et al. ............ 356/5.09 |
| 5,557,347 A | * | 9/1996 | Johnson .................... 356/139.08 |
| 5,774,208 A | * | 6/1998 | Abe ............................ 356/4.01 |
| 5,949,530 A | * | 9/1999 | Wetteborn ................. 356/5.01 |
| 5,949,531 A | * | 9/1999 | Ehbets et al. .............. 356/5.01 |
| 5,988,862 A | * | 11/1999 | Kacyra et al. ............... 364/578 |
| 6,115,112 A | | 9/2000 | Hertzman et al. |
| 6,229,598 B1 | * | 5/2001 | Yoshida ..................... 356/5.01 |
| 6,263,004 B1 | | 7/2001 | Arvidsson et al. |

FOREIGN PATENT DOCUMENTS

| | | |
|---|---|---|
| EP | 0706 063 A1 | 4/1996 |
| GB | 1180778 | 2/1970 |
| WO | WO 94/27164 | 5/1993 |
| WO | WO 94/27164 | 11/1994 |
| WO | WO 97/31411 | 8/1997 |
| WO | WO/97/40342 | 10/1997 |

* cited by examiner

*Primary Examiner*—Thomas H. Tarcza
*Assistant Examiner*—Brian Andrea
(74) *Attorney, Agent, or Firm*—Killworth, Gottman, Hagan & Schaeff LLP

(57) ABSTRACT

The invention relates to an electronic distance measuring device which measures the propagation time to and from a target of a shor pulse of a trasmitted electromagnetic beam from a radiation source comprising a microchip laser, and comprising objective optical system (6; 16; 21); for the reflected beam from the target and a detecting unit (9; 13; 20) to which the received beam is transmitted. Means (4, 5; 15) is provided for making the transmitted and the receiving electromagnetic beam coaxial. Means (6, 10, 12; 14, 16; 21, 22) are also provided for focusing the received beam onto the detecting unit (9; 13; 20). A means (3) makes the transmitted electromagnetic beam simultaneously as narrow and as collimated as possible in order to get a well-defined radiation measuring spot on the target.

19 Claims, 2 Drawing Sheets

ELECTRONIC DISTANCE MEASURING DEVICE

This invention relates to an electronic distance measuring device of the kind in accordance with the preamble of claim 1.

Electronic distance meters (EDM) which measure by directing an electromagnetic beam, such as a light beam, towards a target and collecting reflected radiation are principally of the phase measuring or the propagation delay time measuring kind. Some of these kinds of measuring instruments are adapted for making distance measurements against natural objects, i.e. against objects which are not provided with reflectors, for example prism reflectors, such as cube corner reflectors. A phase measuring distance meter uses a more or less continuous emitted beam, i.e. a beam provided with an almost symmetric modulation with one or more frequencies, but there are also phase measuring instruments working with short pulses. A propagation time measuring distance meter uses short pulses, which are emitted repeatedly with a determined pulse emission rate where the time interval between pulses is longer than the expected time for a pulse to propagate to and from the target.

Typically, the propagation time measuring system has a longer range than the phase measuring system since the intensity of each pulse can be higher. The most common light sources are pulsed laser diodes.

A number of difficulties and disadvantages with the prior known distance meter constructions for measuring with diffuse reflexion against natural targets can be summarised in the following way:

The light to be used often has a wavelength that lies outside the visible wavelength band. This leads to the fact that the operator does not see the target point against which the measurement is taken.

The emitting area of the light source must have a certain width to be able to provide a power that is high enough for a reasonable range. This leads to a beam with a rather wide divergence and that the measuring point, i.e. the lightened are, will have a large diameter when the distance to the target is long.

The emitted cone angle from the light source is wide. This leads to a large diameter of the optical system of the transmitter if there is a wish to emit a narrow beam (a long focal length) and at the same time have an output power which is large enough to get a reliable measuring result. This leads in turn to a wide beam diameter at the target when measurements are made to short distance targets.

The light transmitter and receiver use different optical system units or different parts of the same optical system with some kind of separating wall between them. When the transmitter and receiver optical system are adjusted to be parallel to each other in order to provide a maximum signal amplitude when measuring towards distant targets, then the receiver will not "see" the lightened area when measurements are made towards nearby targets. This means that a reflected signal will not be obtained when the measurement is made towards nearby targets positioned at a distance shorter than a certain distance from the distance meter.

DESCRIPTION OF RELATED ART

EP 706 063 (COMMISARIAT A L'ENERGIE ATOMIQUE) describes a microchip laser, which is passively Q-switched, for use in a distance meter. The advantage is that this kind of laser generates a narrow, pulsed beam having a minor divergence. However, the passive Q-switching gives a problem due to the fact that the exact time for emitting the light pulses can not be controlled. A solution of the problem for measuring towards nearby targets is not mentioned or discussed. The electronic solution assumes detection of separate pulses. This limits the range since it presupposes that every received pulse has an amplitude which is higher than the background noise. Since, the present invention relates to an electronic distance measuring system using a microchip laser EP 706 063 has been used as the basis for it and is hence disclosed in the preamble of claim 1.

PCT/SE97/00396 (GEOTRONICS AB, which now has amended its name to SPECTRA PRECISION) describes a system in which received pulses could have a lower amplitude than the background noise. This system demands that the emission time instant of the emitted pulse is controllable, or at least well defined and without jitter. The present invention has been developed in order to provide a well functional distance measuring system based on for example this application. However, the present invention is not restricted to use exactly the kind of microchip laser disclosed in PCT/SE97/00396.

Some efforts have also been made to eliminate some of the disadvantages described above, however for a phase measuring system. EP 701 702 (Leica AB) describes a system in which a laser diode is used having a wavelength within the visible wavelength band. This is accomplished with the requirement that a phase measuring distance meter must be used, since laser diodes emitting within the visible wavelength band are not able to provide pulse power high enough for propagation time measurements within reasonable distances, i.e. exceeding 50 m. It is mentioned that the pulse length could be as low as 2 ns, but nevertheless it is a phase measuring system. This system allows, however, the use of a well collimated light beam but the range is too short for most applications.

OBJECTS OF THE INVENTION

An object with the invention is to provide an electronic distance measuring system, which solves all of the disadvantages stated above.

A particular object of the invention is to provide a well functioning distance measuring system comprising a microchip laser as the radiation source.

One object of the invention is thus to provide an electronic distance measuring system with a narrow transmitted beam in order to establish a well defined measuring spot on the target able to measure towards nearby targets as well as to distant targets.

Still another object of the invention is to provide an electronic distance measuring system able to make long range measurements, for example to targets more than 50 m away.

Another object of the invention is to provide an electronic distance measuring system in which the point on the target towards a measuring is to be made is visible for the operator of the system, at least during adjustment of the sighting towards the target.

THE INVENTION

The objects stated above are solved with an EDM system having the features disclosed in the independent claim. Further features and further developments are disclosed in the rest of the claims.

The invention has been developed to use a microchip laser, where the instant for emitting a beam pulse is controllable, in a distance measuring device. This kind of possible light source could be an actively. Q-switched laser or a combined actively and passively Q-switched laser of the kind disclosed in the Swedish patent application No 9702175-2 (SPECTRA PRECISION).

The light source disclosed in the specification mentioned above generates an emitted beam having a small diameter. By means of a beam expander the beam divergence can be minimised to a suitable level and the beam can be given an adapted beam diameter. For example, it is possible to choose a divergence of 0.3 mrad and to have a beam diameter of less than 5 mm. The microchip laser emits normally light within the infrared (IR) wavelength band. However, a frequency doubling crystal could be provided at the output of the laser or inside the laser cavity in order to generate visible light.

The invention relates to an electronic distance measuring device which measures the propagation time to and from a target of a short pulse of a transmitted electromagnetic beam from a radiation source comprising a microchip laser, and comprising objective optical system for the reflected beam from the target and a detecting unit to which the received beam is transmitted. Means is provided for making the transmitted and the receiving electromagnetic beam coaxial. Means are also provided for focusing the received beam onto the detecting unit. A means makes the transmitted electromagnetic beam simultaneously as narrow and as collimated as possible in order to get a well-defined radiation measuring spot on the target. A control means determines the times of each transmitted electromagnetic pulse by means of a fixed electronic reference.

The device preferably comprises means for making the transmitted and the received electromagnetic beams coaxial, and target adaptation means for enabling the optical system to direct part of the received beam reflected from the target to the detector means irrespective of whether the target is a nearby or distant target. The target adaptation means could comprise a flexible optical fibre coupled to a detector in the detector unit. The free fibre end could be moved manually or by a actuator, such as a motor, to a position in which the measuring point on the target is focused.

Alternatively the target adaptation means could be a lens means movable along the optical axis of the receiving optical system and providing different focusing for different positions, the target adaptation means being moved manually or automatically to a position where the reflected beam from the target is focused on the detector unit. Another alternative is to let the target adaptation means be an object lens system in which parts of the aperture have different focal lengths such that both the shortest and the longest target limits to which measurements could be made are focused to the detector unit by some part of the aperture. For instance, a ring-shaped lens means covering a pail of the incoming beam reflected from the target and in co-operation with the objective optical system could then focus beams coming from the minimum range for a nearby target on the detector unit while the optical system not covered by the ring-formed lens could focus beams coming from distant targets on the detector unit.

It is possible to let the radiation source emit light within the visible wavelength band. However, it is also possible to let the radiation source means emit visible light during an adjustment period for aiming the device towards the target before the actual measurements, and to let the radiation source means emit electromagnetic beam pulses in a wavelength outside the visible wavelength band during the actual measurements. It is also possible to use two different sources, one visible for pointing and one IR source for measurement. It is possible to have these sources emitting radiation simultaneously.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF EMBODIMENTS

Figure 1:
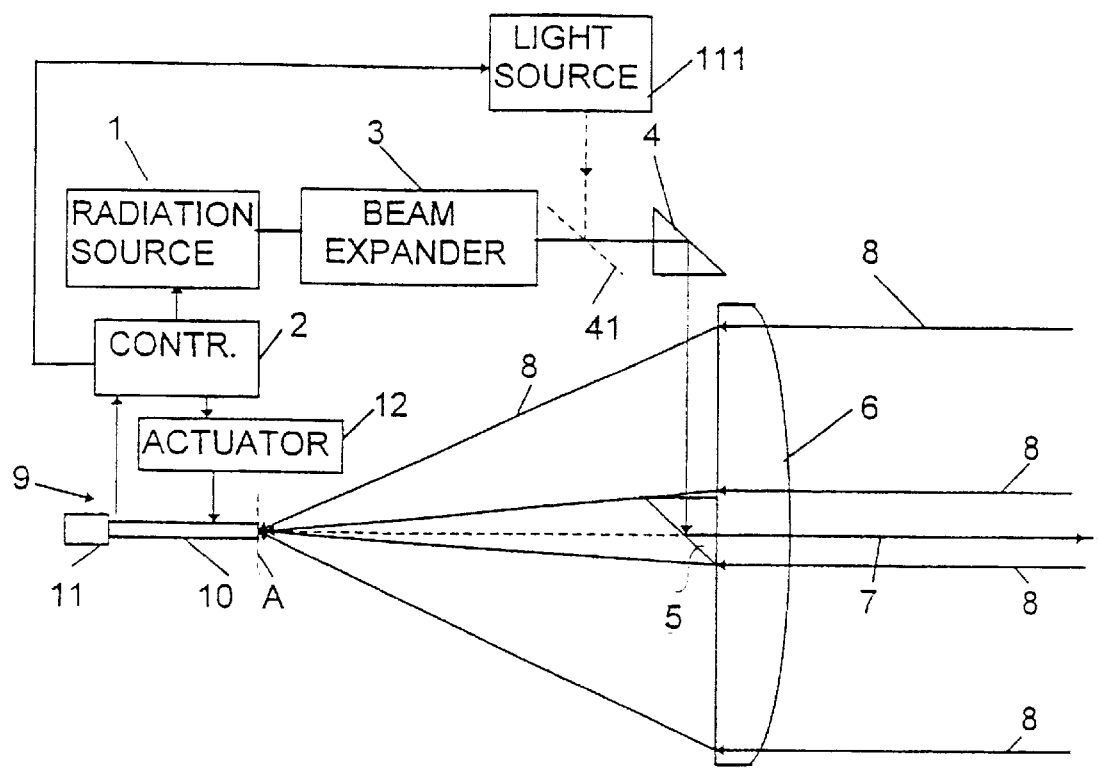
FIG. 1 shows an optical arrangement in accordance with a first embodiment of the invention.

Referring to FIG. 1, a light source 1 being a microchip laser, preferably an actively or actively and passively Q-switched laser, emits a laser beam under the control of a control unit 2. This control unit determines the beginning of the time measurement by means of a fixed electronic reference. The time instant for each emitted pulse, i.e. the pulse emission instant, will then be particularly well-defined.

The light beam is fed through a beam expander 3 and two prisms 4 and 5 which move the beam parallel to and centred with respect to the centre of a lens or a lens system 6 which belongs to the receiving optical system of a receiver unit. The purpose of the expander 3 is to lower the unavoidable divergence of the emitted beam such that the smallest possible measuring spot on the target is provided by an emitted beam which is simultaneously as narrow and as little diverged as possible. The relation between the beam diameter and the beam divergence has a given connection for a laser beam. A small measuring spot on the target is wanted in order to get a well defined measuring point, for instance when measuring is made close to a corner.

The prism 5, below called the transmitting prism, through which the beam 7 emitted by the laser system 1, 3, 4, 5 is transmitted towards the target, gives a small shielding of the receiving optical system 6.

The returning beam 8 reflected by the target is received by the receiving optical system 6 outside the shielded centre area. The receiving optical system is focused on a receiving detector unit 9, which in FIG. 1 is shown to have its receiving end positioned at the focal plane A of the lens system 6. The output of the detector unit 9 is fed to an input of the control unit 2. The control unit 2 preferably incorporates a computer, which performs the computation of the distance to the target.

The optical system shown in this embodiment is coaxial and symmetrical. It provides a small and well defined measuring spot on the target which for example could have a diameter smaller than 30 mm at a distance at 100 m. The optical system in FIG. 1 illustrates the beam paths in case of measuring towards a long range target. The reflected beam returning from the target is practically collimated.

The light source 1 could emit radiation within the visible or the infrared (IR) wavelength band in this embodiment. If it emits IR radiation then the operator could not see the light spot on the target. A way to overcome this disadvantage is to provide an extra light source 111 having visible light which then could be more continuous than the beam from the light source 1. The control unit 2 controls the light source 111 to emit its light beam into the optical path through a half transmitting or dichroic mirror 41 into the optical path when the operator is adjusting the instrument beam towards the target. Thereafter, the control unit 2 can switch off the light source 111 and activate the light source 1 in order to make the actual measurements towards the target. However, it is also possible to have the light source 111 activated during the whole measurement procedure.

Figure 2:
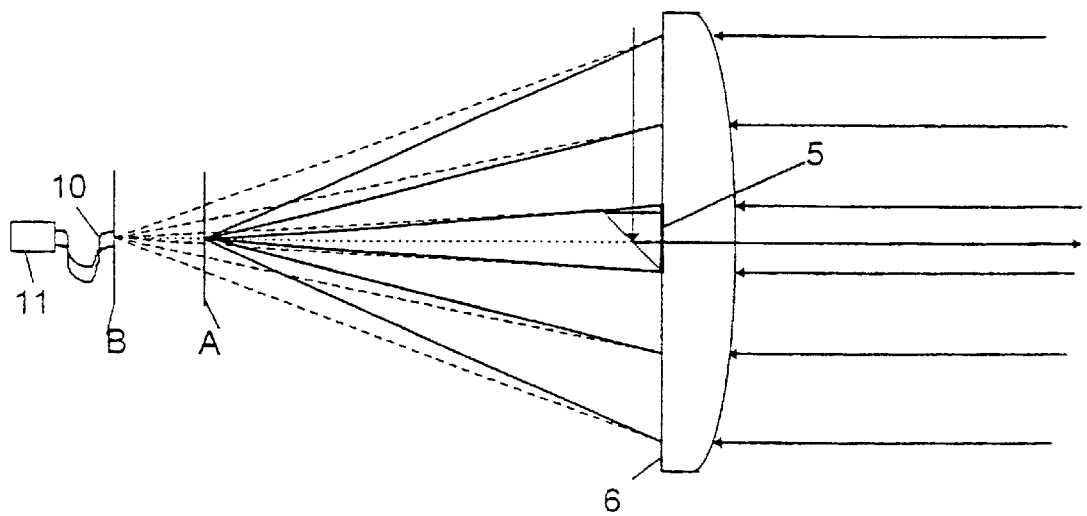
FIG. 2 show an embodiment in two different stages adapted for making measurements to short range targets and long range targets, respectively.

FIG. 2 illustrates the situation when measurements are provided against a short range target in relation to against a long range target. When the measurement is made towards a short range target receiving optical system 6 will focus the beam to an image plane B positioned more distant from the lens system 6 than the focal plane A towards which the lens system will focus collimated impinging beams.

If the detector is positioned at the focal plane A when measurements are made towards short range targets it is positioned in the beam cone which is shaded by the transmitting prism 5 and the detector 9 can not receive any measuring signal. This problem is solved in the embodiment shown in FIG. 1 by having the detector unit 9 movable between the planes A and B.

The detector unit 9 could then preferably comprise an optical fibre 10 connected to a detector 11. The free fibre end is then turned towards the impinging light. Thereby, the detector with its electrical connection could be stationary and it is only the fibre end, which is moved along the optical axis. The fibre end is easier to move since it has no electrical connections.

The movement could be made manually by the operator, but it could also be automatically provided when the control unit 2 has discovered that no or unsufficient signal has been received; The control unit 2 could then try different positions by controlling an actuator 12, for example a motor, for moving the detector unit 9 until a measuring signal is detected, computing the distance to the target, and then adjusting the position by aid of the actuator 12 to the focal point for that distance in order to provide a more exact distance value, i.e. to get a maximal signal.

Another embodiment for providing a re-focusing of the detector unit 9 is to couple the fibre end mechanically to the focusing mechanism of the telescope which normally is provided in the system in order to direct the instrument beam to a target (not shown).

Figure 3:
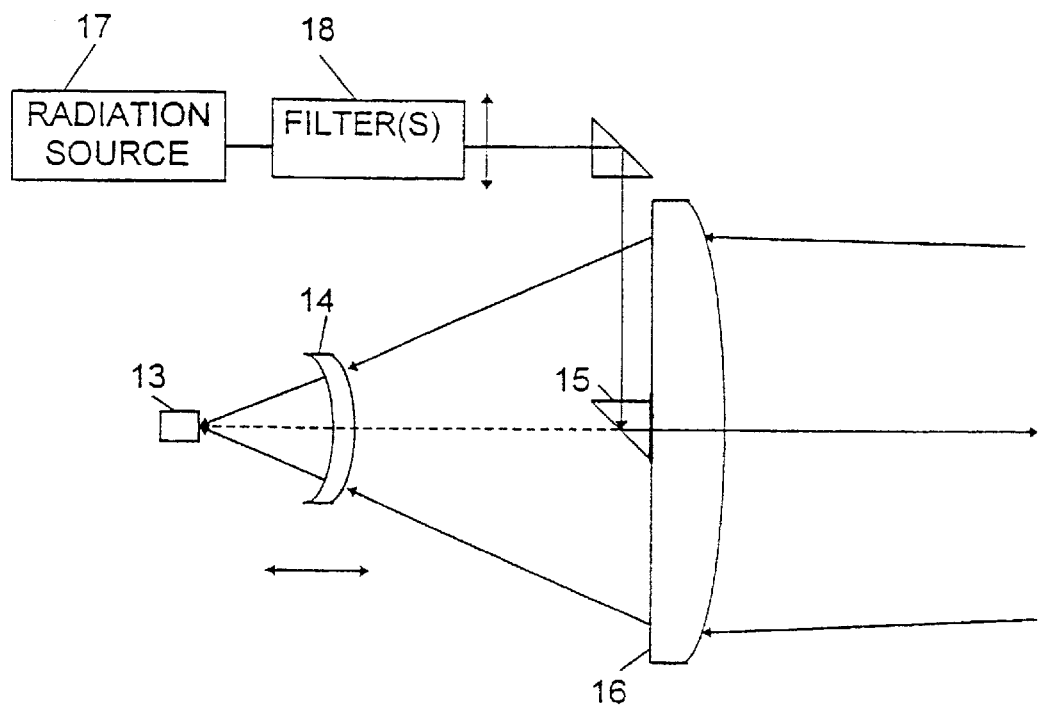
FIG. 3 shows an optical arrangement in accordance with a second embodiment of the invention.

In the second embodiment shown in FIG. 3 the detector unit 13 is immovably fixed, and a lens 14 (or a lens system) is movably positioned, manually or automatically, between the objective lens 16 and the detector unit 13 in order to create an adjustable focal distance. The detector can always be positioned in focus in this way. (It is to be noted that a movable lens instead could be positioned outside the objective lens 16 in the position shown in FIG. 4.) The detector unit 13 could also in this embodiment.comprise a detector element having an optical fibre in front of it as in the embodiment in FIG. 1 (not shown).

In the embodiment shown in FIG. 3 the light source 17 could be a microchip laser emitting IR radiation and having a beam expander (not shown in this embodiment). The light source is in this embodiment provided with a frequency doubling crystal to transform the laser light into visible light. The doubling efficiency is not very high. Both IR radiation and visible radiation will be emitted from the doubling crystal. By using different filters 18 after the doubling crystal it is possible to let either the IR or the visible radiation be emitted or both. Filters can be switched between pointing and measurement either manually or via some actuator controlled by the controller(s), as illustrated by the arrow to the right. The control unit controlling the different elements is not shown in this embodiment for clarity reasons.

Figure 4:
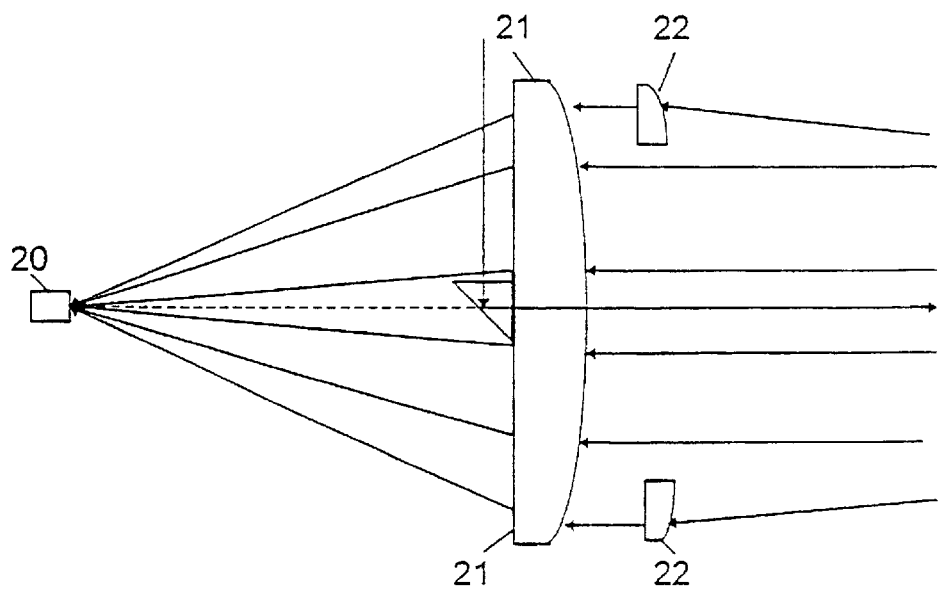
FIG. 4 shows an optical arrangement in accordance with a third embodiment of the invention.

In the third embodiment, shown in FIG. 4, which only shows the optical elements, the detector unit 20 is also fixedly mounted in relation to the objective lens 21. An optical element 22 is designed such that the part of the beam passing through it and the lens 21 is deviated with a different focal length than the part that passes only through the lens 21. The focal length of the double system 21, 22 is adapted to nearby objects. By suitable optimisation of the focal lengths and dimension of the element 22, and by using the aberrations in the optical system it is possible to obtain a high enough signal at the detector/detector fibre within a chosen object distance interval. It is to be noted that instead of having the extra optical element outside the objective lens 21 it could be seated inside this lens for example in the position shown for the lens 14 in FIG. 3.

The optical element 22 is preferably ring shaped, but in principle other shapes are possible, like for example a segment or a full circle. It can be a part of a lens or a wedge, or it can be a diffractive optical element. Of course it can also be integrally combined with the element 21.

While the invention has been described with reference to specific embodiments, it will be understood by those skilled in the art that various changes may be made and equivalents may be substituted for elements thereof without departing from the scope of the invention as defined in the accompanying claims. It is to be noted that control features described for the different embodiments could be made in all the embodiments both separately and in combination. It is also apparent for the person skilled in the art that the optical systems must not be a lens system. It could as well be a mirror system comprising curved mirrors and beam bending elements.

I claim:

1. An electronic distance measuring device which measures the propagation time to and from a target of a short pulse of a transmitted electromagnetic beam comprising:
    a microchip laser radiation source configured such that the instant in which the beam is emitted from the radiation source is controllable;
    an objective optical system configured to receive the beam reflected from the target;
    a detecting unit to which the received beam is transmitted;
    means for making the transmitted and the received electromagnetic beam coaxial;
    means for focusing the received beam onto the detecting unit; and
    means for collimating the transmitted electromagnetic beam to provide a narrow and well-defined radiation measuring spot on the target.

2. A device according to claim 1, further comprising control means determining the instant in time of each transmitted electromagnetic pulse by means of a fixed electronic reference.

3. A device according to claim 1, further comprising target adaptation means for making the optical system to focus at least a part of the received beam reflected from the target on to the detector means irrespective of whether the target is a long or short range target.

4. A device according to claim 3, in which the target adaptation means comprises a flexible optical fibre provided in front of a detector in the detector unit.

5. A device according to claim 4, further comprising an actuator for moving the light receiving part of the detector unit to a position in which the measuring point on the target is focused on said outer fibre end.

6. A device according to claim 3, in which the target adaptation means is an optical system means movable along the optical axis of the receiving optical system and providing different focusing for different positions, the target adaptation means being moved manually or automatically to a position where a part of the reflected beam from the target, large enough to make a measurement, reaches the detector unit.

7. A device according to claim 3, in which the target adaptation means comprises an objective optical system in which parts of the aperture have different focal lengths than the rest such that radiation from both the shortest and the longest target ranges to which measurements shall be made is directed on to the detector unit.

8. A device according to claim 7, further comprising additional optical system means covering a part of the incoming beam reflected from the target and in cooperation with the objective optical system is adapted to direct beams coming from the shortest limit for a short range target onto the detector unit while the objective optical system not covered by the additional optical system means focuses beams coming from long range targets onto the detector unit.

9. A device according to claim 1, in which the radiation source emits radiation within the visible wavelength band.

10. A device according to claim 1, in which the radiation source is adapted to emit visible radiation during an adjustment period for aiming the device towards the target before the actual measurement, and that the radiation source is adapted to emit electromagnetic beam pulses in a wavelength outside the visible wavelength band during measurement.

11. A device according to claim 1, further comprising an extra light source emitting radiation within the visible wavelength region towards the target onto the measuring point simultaneously with the radiation source emitting radiation for distance measurement.

12. A device according to claim 1, wherein the radiation source comprises a select one of an actively Q-switched microchip laser and an actively and passively Q-switched microchip laser.

13. A device according to claim 1, wherein said means for focusing the received beam is coaxial with the transmission of the beam from the device.

14. An electronic distance measuring device which measures the propagation time to and from a target of a short pulse of a transmitted electromagnetic beam from a radiation source comprising:

a microchip laser configured as a select one of an actively Q-switched laser and an actively and passively Q-switched laser;

an objective optical system arranged to receive the reflected beam from the target;

a detecting unit to which the received beam is transmitted; means for making the transmitted and the receiving electromagnetic beam coaxial;

means for focusing the received beam onto the detecting unit;

means for collimating the transmitted electromagnetic beam to provide a narrow and well-defined radiation measuring spot on the target; and control means determining the transmission point of time of each transmitted electromagnetic pulse of the microchip laser by means of a fixed electronic reference.

15. An electronic distance measuring device comprising:

a radiation source configured such that an instant in time in which a short pulse of an electromagnetic beam is emitted from the radiation source is controllable;

a control unit operatively coupled to the radiation source arranged to provide an electronic reference signal to the radiation source to determine the instant in time in which the beam is to be transmitted:

a beam expander positioned relative to the radiation source arranged to lower the divergence of the beam emitted by the radiation source;

an optical system arranged to coaxially transmit and receive the beam; and a detector unit coaxial with the optical system, wherein the optical system is arranged to receive a portion of the beam reflected by a target and cooperate with the detector unit to focus the received beam onto the detector unit.

16. A device according to claim 15, further comprising a flexible optical fibre provided in front of a detector in the detector unit and an actuator for moving a light receiving part of the detector unit to a position in which the measuring point on the target is focused on an outer fibre end.

17. A device according to claim 15, further comprising an objective optical system in which parts of an aperture have different focal lengths such that a reflected beam from both the shortest and the longest target ranges to which measurements shall be made is directed on to the detector unit.

18. A device according to claim 15, wherein the radiation source is adapted to emit visible radiation during an adjustment period for aiming the device towards the target before an actual measurement, and that the radiation source is adapted to emit electromagnetic beam pulses in a wavelength outside the visible wavelength band during measurement.

19. A device according to claim 15, wherein the detector unit is coaxial with the optical system.

* * * * *